May 17, 1949.  F. G. SUFFIELD  2,470,666
TUBE
Filed Aug. 25, 1944
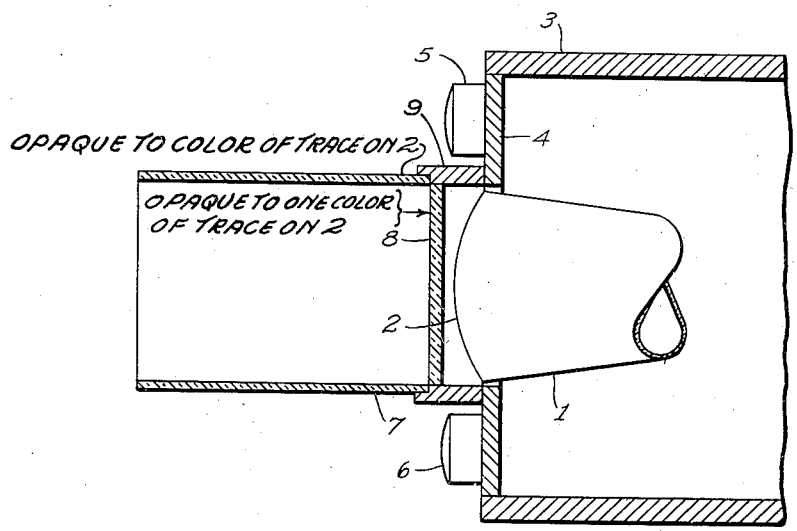
WITNESSES:
C. J. Weller.
INVENTOR
Frederick G. Suffield.
BY
F. W. Lyle
ATTORNEY Patented May 17, 1949

2,470,666

UNITED STATES PATENT OFFICE 2,470,666

TUBE

Frederick G. Suffield, Baltimore, Md., assignor to Westinghouse Electric Corporation, East Pittsburgh, Pa., a corporation of Pennsylvania Application August 25, 1944, Serial No. 551,124

5 Claims. (Cl. 250—164)

My invention relates to light-shielding enclosures, and, particularly, relates to such enclosures for the screen-end of cathode-ray tubes.

Cathode-ray tubes of a type widely used as indicating and measuring devices in the electrical instrument art have screens, usually in the form of a spherical segment, surfaced with phosphorescent material (i. e. with phosphors) on which incidence of a narrow cathode-ray beam inside the tube produces a luminous trace. Movement of the incidence of the cathode-ray beam over the surface of the screen traces wave forms and other contours in a manner well known to those skilled in the art. I have found in the case of certain well-known phosphors that during such motion, the beam first produces, at any point of incidence, a bright blue flash followed by an amber afterglow. The luminous intensity of the lines traced is, however, low compared to that of surfaces exposed to ordinary daylight, and it is, accordingly, necessary to shield the cathode-ray screen from incidence of stray light by means of opaque hoods or opposing walls of the like. However, in certain uses of such cathode-ray tubes, notably for navigation of airplanes, the screen of the cathode-ray tubes is surrounded by numerous dials of other instruments such as ampere meters and the like, and the use of an opaque enclosure makes it difficult or impossible to see the latter during observation of the screen.

One object of my invention is, accordingly, to substitute for opaque-wall enclosures, such as those above mentioned, enclosing walls in the form of optical filters, transparent to light of certain wave lengths, which will not interfere with the visibility of the traces on the screen of the cathode-ray oscillograph but will still permit reading of other instruments surrounding the latter.

Another object of my invention is to provide the screen of a cathode-ray oscillograph with a filter, roughly parallel and adjacent thereto, which shall transmit light of one wave length emanating from the cathode-ray trace, for instance the above-mentioned "blue flash," but which will cut off light of other wave lengths, tending to be emitted by (e. g. the amber afterglow) or reflected from the screen of the cathode-ray tube.

Other objects of my invention will become apparent upon reading the following description taken in connection with the single figure of the drawing which is a schematic representation, partly in cross section and partly in elevation, showing a screen of a cathode-ray tube provided with enclosing walls and adjacent the parallel filter of the type embodying the principles of my invention.

Referring, in particular, to the drawing, a cathode-ray tube 1, of which only the end adjoining the luminous screen 2 is shown, is enclosed within a housing having walls 3 of some suitable opaque material. The screen 2 of the cathode-ray tube may be coated with phosphor (e. g. willemite) and be surrounded by a panel 4 of some suitable opaque material having an opening through which the screen 2 projects. Alternatively the screen may be coated with a multi-layer consisting of a phosphor luminescing with one color, such as blue, mixed with or superposed on another phosphor which luminesces with another color such as orange-yellow. The colors may have different optical persistences so that, for instance, the blue may be a bright flash and the orange-yellow an afterglow. In the panel 4 may be set any desired number of indicating instruments 5, 6 for physical quantities which it may be desired to observe.

The region in front of the screen 2 may be surrounded by walls 7 forming a hood, comprising, in whole or in part, an optical filter which is opaque to light of the color to be observed in the trace on the screen 2 (e. g. orange-yellow), but is largely transparent to light of other colors. The light passing through the walls 7 will be deficient in the orange-yellow, but the colors transmitted thereby render the instruments 5, 6 plainly visible to the eye of an observer at all times. When on the other hand, the cathode-ray beam traces a curve on the screen 2, the orange afterglow on the latter will be quite plainly visible because of the absence of light of those wave lengths in the incident light transmitted by the walls 7 and reflected by the panel 4 and the screen 2. The absence of these colors, when the screen is not illuminated, will render the eye of the observer more than normally sensitive to them.

In order to supplement the desirable results produced by the enclosing walls 7, an optical filter 8 may be supported in front of the screen 2 by suitable projections 9 from the panel 4. The optical screen 8 is a filter which is readily transparent to the phosphorescent color desired (e. g. orange-yellow). The filter 8 will pass the orange afterglow trace. It will, moreover, decrease the amount of stray light passing toward the screen 2 through the walls 7 and reflecting from the screen 2 back into the eyes of the observer.

To give further illustrations of the application of the principles of my invention I give the following tabulation of various screen-phosphors with the filters 8 and hood 7 suitable for use with them.

| Phosphor No. | Visual Color | Filter |
|---|---|---|
| P-1 | Green | 1. For general observation—green filter.<br>2. For hooded observation—green filter and red hood. |
| P-2 | Blue-white | 1. General observation—blue filter.<br>2. Hooded use one combination blue filter and red hood. |
| P-3 | Yellow | 1. General observation—orange or red filter.<br>2. Hooded—orange or red filter blue or blue-green hood. |
| P-5 | Bluish | 1. General—blue filter.<br>2. Hooded—red hood blue filter. |
| P-7 | Blue and Yellow | 1. General:<br>  A. For short persistence—use blue filter.<br>  B. For long persistence—use amber or orange filter.<br>2. Hooded:<br>  A. Short persistence—use blue filter, red hood.<br>  B. Long persistence—use amber or orange filter, blue, or blue-green hood. |
| Screen consists of primary blue layer, intermediate green coating, final yellow layer. Electron beam excites blue to high flash intensity. Blue in turn excites yellow to long persistence glow. | | |

To give specific examples of the materials of which the filters 8 and the walls of hood 7 may be made, the Handbook of Chemistry and Physics, 24th edition, published by Chemical Rubber Publishing Company, Cleveland, Ohio, contains, beginning at page 2167, a tabulation of colored glasses of American manufacture from which materials suitable for the filter 8 and the walls of hood 7 may be selected. The following table identifies, by column headings in that publication, glasses which are respectively suitable for the filter 8 and the walls 7.

| Phosphor No. | Filter | Walls | |
|---|---|---|---|
| P-1 | BL Green 19 | CG-244 | |
| P-2 | BL Blue O | CG-244 | |
| P-3 | OG-2 | BL Green 19 | |
| P-5 | BL Blue O | CG-244 | |
| P-7 | BL Blue O | G-244 | To observe short persistence trace. |
| P-7 | OG-2 | BL Blue 19 | To observe long persistence trace. |

While I have described the filter 8, as a supplement to the enclosing walls 7, it will be recognized that under some circumstances it may be desirable for economic or other reasons to omit the hood 7 and employ only the filter 8, or to omit the filter 8 and employ only hood 7.

While I have described a particular embodiment of the principles of my invention to comply with particular statutes, it will be recognized that these principles are applicable in other ways which will be apparent to those skilled in the art.

I claim as my invention:

1. In combination with a cathode-ray tube, having a fluorescent screen on which a cathode-ray beam produces a trace of predetermined color, an optical path over which an observer can view said screen, enclosing walls about said path consisting at least in part of a material, having substantially higher opacity to said color than it has to other colors.

2. In combination with a cathode-ray tube, having a screen coated with willemite, an optical path over which an observer can view said screen, enclosing walls about said path, consisting at least in part of an area of material which is opaque to wave lengths in the blue-green but is transparent to wave lengths in the other portions of the spectrum.

3. An enclosing chamber for the screen of a cathode-ray tube comprising walls surrounding an optical path over which an observer can view said screen and consisting at least in part of a material which is more transparent to red light than to light in other portions of the spectrum.

4. An enclosing chamber for the screen of a cathode-ray tube coated with willemite, comprising enclosing walls surrounding an optical path over which an observer can view said screen and consisting at least in part of an area of material more highly transparent to light in other portions of the spectrum than to light of the blue-green portion.

5. An enclosure for a cathode-ray tube which has a fluorescent screen emitting light of one color when bombarded with electrons, said enclosure having all portions surrounding an optical path over which an observer can view said screen which is less transparent to said one color than to other colors.

FREDERICK G. SUFFIELD.

REFERENCES CITED

The following references are of record in the file of this patent:

UNITED STATES PATENTS

| Number | Name | Date |
|---|---|---|
| 1,691,324 | Zworykin | Nov. 13, 1928 |
| 2,015,570 | Sabbah et al. | Sept. 24, 1935 |
| 2,026,725 | Baker | Jan. 7, 1936 |
| 2,051,632 | Batchelor | Aug. 18, 1936 |
| 2,312,206 | Calbick | Feb. 23, 1943 |
| 2,402,762 | Leverenz | June 25, 1946 |

FOREIGN PATENTS

| Number | Country | Date |
|---|---|---|
| 395,578 | Great Britain | July 20, 1933 |
| 426,789 | Great Britain | Apr. 5, 1935 |
| 426,797 | Great Britain | Apr. 10, 1935 |
| 445,978 | Great Britain | Dec. 20, 1935 |